Oct. 31, 1961 R. R. BURDICK ET AL 3,006,651

MOUNTING MEANS FOR PHONOGRAPH TONE ARMS

Filed May 20, 1958

INVENTORS

ROBERT R. BURDICK

DUANE E. PUNKAR

BY Francis J. Klempay

ATTORNEY

United States Patent Office 3,006,651

Patented Oct. 31, 1961

3,006,651

MOUNTING MEANS FOR PHONOGRAPH TONE ARMS

Robert R. Burdick and Duane E. Punkar, Conneaut, Ohio, assignors to The Astatic Corporation, Conneaut, Ohio, a corporation of Ohio Filed May 20, 1958, Ser. No. 736,530
6 Claims. (Cl. 274—23)

The present invention relates generally to the art of sound recording and reproduction and more particularly to phonograph reproducing apparatus. As is well known by those skilled in the art, such apparatus usually comprises a power driven turntable upon which a flat record disc is placed and made to rotate at a pre-selected constant speed, a pickup cartridge including one or more styli for sensing the undulations in the record disc groove and a mechanical to electrical transducer for converting the sensed mechanical vibrations to electrical signals, an elongated phonograph tone arm mounting the pickup cartridge in its outer free end, mounting means for securing the tone arm at its other end for universal pivotal movement whereby the pickup cartridge is free for movement across the record disc and the entire tone arm assembly may be pivoted vertically and suitable amplifiers and loudspeakers for amplifying the electrical signals from the pickup cartridge and converting the same to audible sound. The present invention is primarily concerned with and specifically directed to the mounting means for the phonograph tone arm.

The mounting means for the tone arm in phonograph reproducing apparatus must perform several functions and should have several desirable operational characteristics. In the first place the mounting means must provide for smooth and substantially friction free lateral swinging motion of the tone arm in a horizontal plane to allow the stylus to track the record disc groove, said groove usually being spirally cut from the outside to the inside of the record disc. Secondly, the mounting means must permit vertical movement of the arm, under manual urging, to facilitate the changing of records and the starting and stopping of record disc playing operation.

Also, the mounting means should provide a certain degree of mechanical isolation between the tone arm assembly—including the tone arm itself and the pickup cartridge—and the supporting base to which the mounting means is attached. It is common in phonograph reproducing apparatus to attach the mounting means to the base board which also supports the driving motor for the turntable and mechanical isolation is necessary in the mounting means to prevent the vibrations and rumble of the driving motor from effecting the operation of the pickup cartridge mounted in the tone arm. The need of mechanical isolation in the mounting means for the tone arm assembly has long been recognized in the art as evidenced by the teaching in the Semple, Jr., et al. patent, No. 2,182,138.

Another desirable characteristic of the mounting means for a phonograph tone arm is the ability to vary the mechanical resonance of the tone arm assembly supported thereby. A tone arm, being of finite length and being constructed as light as practicable, has a natural period of vibration and if it is excited at or near its natural or resonant frequency the resulting vibrations can unduly influence the otherwise smooth frequency response curve of the entire assembly. While tone arms are usually designed to keep the mechanical resonance at the low end of the audible frequency range, it is often desirable to further lower this resonance. The lowering of the mechanical resonance of the tone arm assembly may be accomplished at the point where the tone arm assembly is joined to the mounting means.

Any mounting means for a phonograph tone arm assembly adapted to serve a mass market should be characterized by its economy of production and assembly. To keep production costs at a minimum it is essential that the mounting means be adapted for mass production methods from low cost materials and that the mounting means be designed to keep the number of component parts and assembly operations to an absolute minimum.

It is accordingly the primary or ultimate object of the present invention to provide mounting means for a phonograph tone arm assembly which performs all of the functions and has all of the desirable operational characteristics enumerated above.

More specifically, it is a prime object of the present invention to provide mounting means for a tone arm assembly which provides substantially friction-free universal pivotal movement of the tone arm assembly.

Another object of the invention is the provision of mounting means for a phonograph tone arm which affords a large degree of isolation between the tone arm assembly and the supporting base to which the mounting means is attached.

A further object of the invention is to provide a mounting means for a phonograph tone arm which is capable of changing the overall mechanical resonance of the assembly. Damping means are included to damp or dissipate resonate vibrations of the tone arm assembly itself as will be hereinafter more fully explained.

Yet another object of the invention is the provision of mounting means for a phonograph tone arm assembly which is adapted for mass production methods of manufacture and utilizes low cost materials whereby the cost of the mounting means is kept at a minimum. In accordance with this object of the invention the parts are preferrably formed from the various resinous plastics which are ideally suited for molding operations.

Another object of the invention is the provision of mounting means for a phonograph tone arm assembly wherein the component parts are so designed that the same may be assembled in an easy and efficient manner and in which the parts hold themselves in positive assembled relation without the need of the rivets, snap rings or other fastening devices as required in the prior art.

The above, as well as other objects and advantages of the invention, will become more readily apparent upon consideration of the following specification and accompanying drawing wherein there is disclosed an illustrated embodiment constructed in accordance with the teachings of the present invention.

Figures 1, 2, 3:
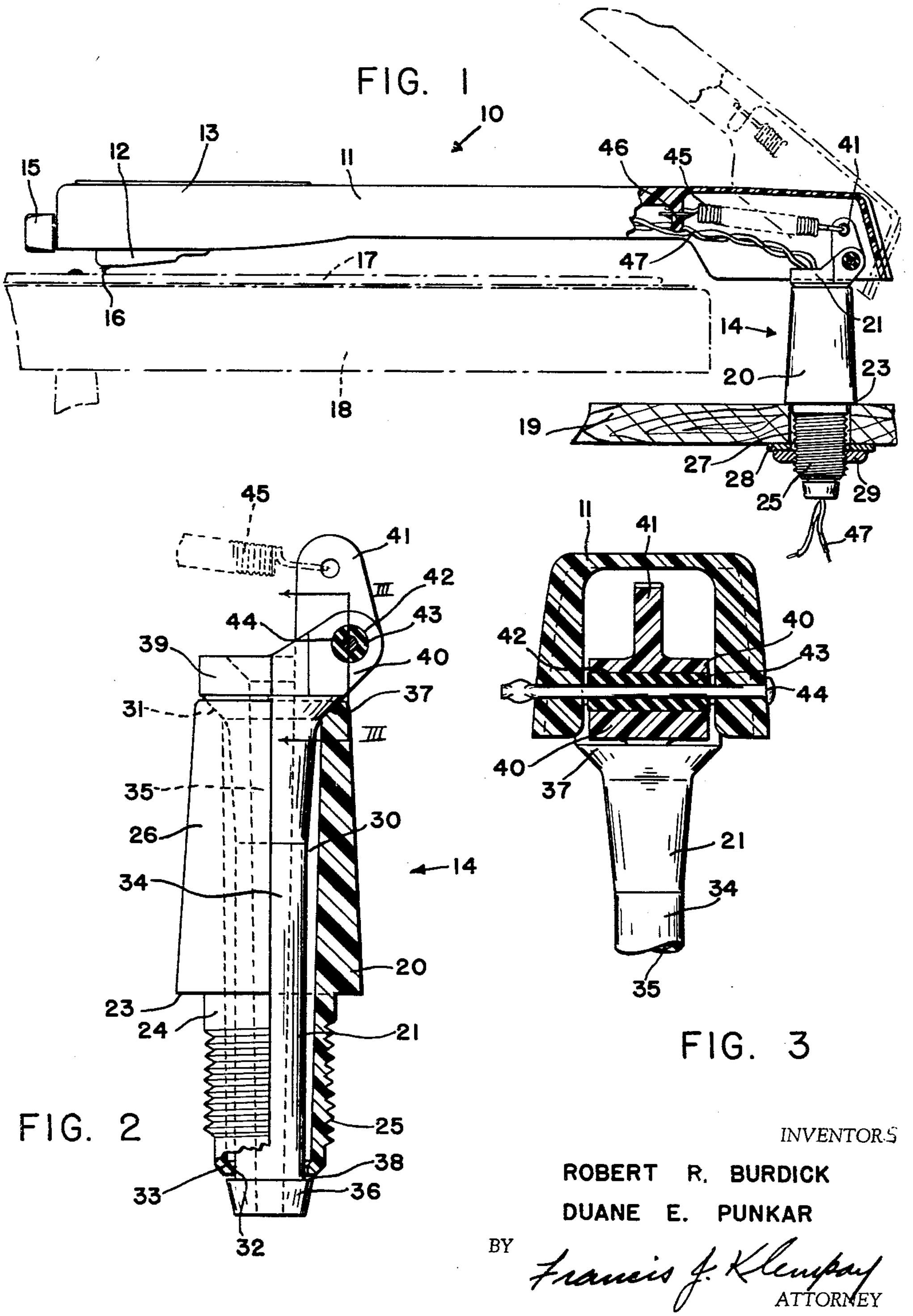
FIGURE 1 is an assembly view, partly in section, of phonograph reproducing apparatus utilizing mounting means for phonograph tone arm assembly constructed in accordance with the teachings of the present invention.
FIGURE 2 is an enlarged side view, partly in section, of the mounting means for a phonograph tone arm assembly.
FIGURE 3 is a fragmentary sectional view taken along the section line III—III of FIGURE 2 showing specifically the pivot connection between the mounting means and the tone arm.

Referring now to the drawing, and initially to FIGURE 1 thereof, the reference numeral 10 designates generally a phonograph tone arm assembly which comprises an elongated tone arm 11 and a phonograph pickup cartridge 12. The elongated tone arm is generally channel shaped in cross section throughout its length and mounts the pickup cartridge 12 in its outer free end 13 while the other end is supported for universal pivotal movement by mounting means 14. The mounting means, to which the present invention is specifically directed, will be hereinafter described in detail.

The pickup cartridge 12 may be of either the single or dual styli type. However, if the later type of pickup cartridge is employed it is preferably mounted within the tone arm 11 on suitable hardware, not shown, whereby the cartridge may be rotated about an axis extending in the same direction as the longitudinal axis of the tone arm to present either of the styli in record disc engaging relation. When such a pickup cartridge is used a forwardly projecting knob 15 would be provided for turning the pickup cartridge to present either of the styli in record disc engaging position.

In FIGURE 1 of the drawing the tone arm 11 and pickup cartridge 12 are shown in operative relation with a stylus 16 of the pickup cartridge engaging the surface of a flat record disc 17. The record disc 17 is placed on the turntable 18 of the phonograph reproducing apparatus which is journaled for rotation and supported by a base board 19. An electric motor, not shown, is mounted on the base board for rotating the turntable 18 at pre-selected constant speeds and it will be noted that the mounting means 14 for supporting the end of the tone arm is also supported by and attached to the base board 19.

The mounting means for a phonograph tone arm assembly of the present invention comprises two general parts—an outer sleeve 20 and and an inner tube 21. The outer sleeve 20 is attached to the base board 19 while the inner tube is journaled in outer sleeve 20 and in turn supports the tone arm assembly 10.

The outer sleeve 20 is provided with an annular shoulder 23 intermediate its ends thereby defining a lower reduced diameter portion 24 having screw threads 25 thereon. The upper end 26 of the outer sleeve 20 is of larger diameter than the lower reduced diameter portion and may be slightly tapered throughout its length to provide a pleasing appearance in the manner shown. Outer sleeve 20 is mounted on the base board 19 with the reduced diameter portion 24 extending and protruding through an aperture 27 provided for this purpose with the shoulder 23 resting against the upper surface of the base board. A suitable washer 28 and locking nut 29 are placed over the lower protruding end of the outer sleeve 20 with the locking nut 29 threadably engaging the screw threads 25 to tightly clamp the mounting means for the phonograph tone arm assembly to the base board.

The interior of the outer sleeve 20 defines a generally cylindrical bore 30 extending the length of the outer sleeve which is flared outwardly at the top thereof to provide an annular beveled surface 31. The angle of the annular beveled surface is not critical, forty-five degrees having been found to be satisfactory. The extreme lower end of the cylindrical bore 30 is provided with an aperture 32 whose diameter is slightly less than the diameter of the cylindrical bore 30 and the surface of the cylindrical bore 30 is connected with the aperture 32 by an inwardly tapering annular surface 33. The functions of the beveled surface 31 and the inwardly tapering annular surface 33 will be hereinafter more fully described.

The inner tube 21 has an elongated and downwardly depending generally cylindrical shank portion 34 having an internal bore 35 extending the length thereof. The lower end of the shank portion 34 of the inner tube 21 is formed with a frustro-conical enlargement 36 whose smaller bottom diameter is slightly smaller than the aperture 32 in the outer sleeve 20 while the major diameter at the top of the frustro-conical enlargement is slightly larger than this aperture and slightly smaller than the diameter of the cylindrical bore 30 extending the length of the outer sleeve 20.

The shank portion 34 of the inner tube 21 is flared upwardly and outwardly adjacent its upper end to define a smooth tapered annular surface 37. The angle of the tapered annular surface 37 is such that it is exactly complementary to the angle of beveled surface 31 on the outer sleeve 20.

It will be apparent from the drawing that the inner tube 21 is received and journaled within the outer sleeve 20. The inner tube and outer sleeve are both molded from suitable resinous plastic material which has been selected for its desirable properties of elasticity and resilience so that these two parts may be assembled. In assembling the two parts the frustro-conical enlargement 36 of the inner sleeve 21 is inserted through the opening at the top of the cylindrical bore 30 of the outer sleeve 20. Upon establishing interference or engagement of the frustro-conical enlargement 36 with the tapering annular surface 33 and the aperture 32 it will be found that nominal manual pressure will cause these two parts to deform sufficiently due to the resiliency of the material from which they are formed to permit the frustro-conical enlargement to snap through the aperture 32. The tapering annular surface 33 and the tapered surface of the enlargement 36 cooperate to allow assembly of the two parts in an easy and efficient manner as is readily apparent. It will be noted that the frustro-conical enlargement terminates in a shoulder 38 of greater diameter than the aperture 32 and once the inner tube 21 has been inserted into the outer sleeve 20 this shoulder prevents the separation of these parts. Thus, the inner tube and outer sleeve are held in positive assembled relation without the use of additional holding devices, such as pins, snap rings, nuts, etc., which have been required in prior art apparatus and the assembly operation for these two parts is characterized by its extreme simplicity.

When the frustro-conical enlargement 36 is inserted through the aperture 32 the tapered annular surface 37 at the upper end of the shank portion 34 of the inner tube 21 will seat smoothly in complementary relation on the beveled surface 31 and these complementary bearing surfaces define a substantially friction free means for journalling the inner tube 21 within the outer sleeve 20. If the inner tube and outer sleeve are molded from some of the softer or "waxier" plastics, such as nylon or polyethylene, for example, no lubrication of the complementary bearing surfaces appears to be necessary. However, when the harder plastics, such as modified polystyrene, are used it may be desirable to provide a thin film of lubricant such as a silicone fluid to reduce the friction between the bearing surfaces.

The upper end of inner tube 21 comprises an integral molded portion 39 defining a transverse boss 40 and an upstanding ear 41 positioned intermediate the ends of the transverse boss 40. The transverse boss is formed with a relatively large diametered transverse bore 42 therein into which a relatively thick walled soft rubber bushing 43 is inserted. Extending through the center of the rubber bushing 43 is an elongated thin rivet 44 which spans the side walls of the channel shaped tone arm 11 adjacent its rear end and defines a horizontal axis about which the phonograph tone arm 11 may be pivoted in a vertical direction. The rivet 44 fits loosely within the rubber bushing 43 but is tightly received within the side walls of the tone arm 11.

The interposition of the rubber bushing 43 between the phonograph tone arm 11 and the inner tube 21 of the mounting means 14 serves as a means for changing mechanical resonance of the phonograph tone arm assembly since this member is soft and compliant and helps to damp resonance in the tone arm assembly. Such a means for changing the mechanical resonance of the tone arm assembly is characterized by its extreme simplicity as is readily apparent.

The upstanding ear 41 of the inner tube 21 serves as an anchor for one end of a tension spring 45. The other end of the tension spring is attached to a molded boss 46 of the tone arm and this tension spring thus acts to bias the entire phonograph tone arm assembly upwardly and away from the record disc 17. The strength of the spring 45 or its length, or both of these variables, may be chosen or adjusted so that the effective pressure of the stylus 16 upon the record disc 17 is held at an optimum value, usually between five to eight grams. As shown in FIGURE 1 of the drawing, a pair of twisted electrical conductors 47 are attached to the pickup cartridge 12 and extend the length of the phonograph tone arm. These conductors are conveniently threaded through the internal bore 35 in the shank portion 34 of the inner tube 21 and are provided for conducting the electrical signals generated by the pickup cartridge to associated amplifiers and loudspeakers, not shown.

It should thus be apparent that we have accomplished the objects initially set forth. The mounting means is such that the phonograph tone arm assembly is adapted for substantially friction free pivotal movement in a horizontal plane to allow the record engaging stylus to follow and sense the variations in the record groove with extreme accuracy. Further, the phonograph tone arm assembly is adapted for vertical pivotal movement as shown by the alternate position thereof depicted by broken lines in FIGURE 1 of the drawing to facilitate changing of the record discs and the starting and stopping of playing operations. The journaling of the inner tube in the outer sleeve and the use of plastic materials having low coefficients of friction allows for ease in lateral pivotal motion of the tone arm. The inner tube and outer sleeve have limited contact areas—only the complementary bearing surfaces engage each other when the two parts are assembled—and this further tends to provide a mounting means for a phonograph tone arm assembly characterized by its substantially friction free mounting of the tone arm.

The resilient nature of the molded plastic inner tube, outer sleeve and the resilient bushing combine to afford the required degree of mechanical isolation between the tone arm assembly and the base board to which the mounting means is secured. The resilient parts of the mounting means absorb and therefore prevent any vibrations of the base board from reaching the phonograph tone arm assembly. In addition, the soft compliant bushing serves as a damping means for absorbing any resonant vibrations of the phonograph tone arm thereby insuring proper operation of the tone arm assembly over the desired frequeny range.

The molded plastic inner tube and outer sleeve are styled and designed for mass production in pressure injection molding equipment while yet presenting a pleasing appearance. In fact, these parts are molded simultaneously with the tone arm so that upon completion of each molding cycle a complete set of parts is produced. Obviously, the specific plastic material used to form the various parts is a matter of choice within the purview of one skilled in the art. After molding it is only necessary to trim the flash from the inner tube and outer sleeve and these parts are then ready for assembly in the manner heretofore described.

It should be apparent that many changes may be made in the illustrated embodiment of the invention without departing from the clear teachings thereof. Accordingly reference should be had to the following appended claims in determining the true scope and intent of the present invention.

We claim:

1. Mounting means for a phonograph tone arm comprising an elongated outer sleeve having a bore therethrough adapted to be secured to a supporting base, said bore terminating in a restricted opening, an elongated inner member, said inner member having an enlargement at the lower end thereof, said enlargement being slightly larger than said restricted opening, said outer sleeve and said inner member being formed from resilient material to permit assembly and thereafter to prevent disassembly of said outer sleeve and said inner member, and means to secure said phonograph tone arm to said inner member.

2. Apparatus according to claim 1 further characterized in that said enlargement has a frustro-conical shape thereby defining an upwardly and outwardly flaring surface adapted to engage and cooperate with said restricted opening during insertion of said inner member.

3. Mounting means for a phonograph tone arm comprising an elongated outer sleeve member having a bore therein adapted to be secured to a supporting base, an inner member received and journaled in said outer sleeve member for rotation therein, one of said members having an enlargement thereon, the other of said members having a restricted opening, said enlargement being slightly larger than said restricted opening, said members being formed from resilient material to permit assembly of said inner member and said outer sleeve member, said enlargement and said restricted opening thereafter coacting to prevent disassembly of said members, and means to secure said phonograph tone arm or the like to said inner member.

4. Mounting means for a phonograph tone arm comprising an outer sleeve adapted to be secured to a supporting base, an inner member journaled for free rotation in and having limited areas of contact with said outer sleeve, a transverse bore in the upper portion of said inner member, a resilient and yieldable annular bushing lining said transverse bore, and pin means extending through said bushing to secure said phonograph tone arm in hinged relation to said inner member, said outer sleeve having a bore extending the length thereof, said bore terminating in a restricted opening, said inner member having an elongated shank portion, said shank portion having an enlargement on the lower end portion thereof, said outer sleeve and said inner member being formed from resilient material, and said enlargement being slightly larger than said restricted opening to permit assembly and thereafter to prevent disassembly of said outer sleeve and said inner member.

5. Apparatus according to claim 4 further characterized in that said restricted opening comprises an aperture, a downwardly and inwardly tapered surface connecting said aperture with said bore in said outer sleeve, and said enlargement on said shank portion being generally frustro-conical and defining an upwardly and outwardly flaring surface.

6. Apparatus according to claim 4 further characterized in that said enlargement on said shank portion is generally frustro-conical in shape and defines an upwardly and outwardly flaring surface.

References Cited in the file of this patent

UNITED STATES PATENTS

| | | |
|---|---|---|
| 1,974,070 | Hibbard | Sept. 18, 1934 |
| 2,497,224 | Laure | Feb. 14, 1950 |
| 2,665,919 | Baker | Jan. 12, 1954 |
| 2,676,806 | Bachman | Apr. 27, 1954 |
| 2,676,807 | Goldmark | Apr. 27, 1954 |
| 2,776,143 | Caltagirone et al. | Jan. 1, 1957 |
| 2,913,284 | Zunkl | Nov. 17, 1959 |